US 6,599,141 B2

(12) United States Patent  
Hambley et al.

(10) Patent No.: US 6,599,141 B2
(45) Date of Patent: Jul. 29, 2003

(54) APPARATUS FOR PROVIDING AC POWER TO AIRBORNE IN-SEAT POWER SYSTEMS

(75) Inventors: Darrell T. Hambley, Arlington, WA (US); Rory G. Briski, Everett, WA (US)

(73) Assignee: General Dynamics OTS (Aerospace), Inc., Redmond, WA (US)

( * ) Notice: Subject to any disclaimer, the term of this patent is extended or adjusted under 35 U.S.C. 154(b) by 0 days.

(21) Appl. No.: 09/863,037

(22) Filed: May 22, 2001

(65) Prior Publication Data

US 2002/0161484 A1 Oct. 31, 2002

Related U.S. Application Data

(60) Provisional application No. 60/286,914, filed on Apr. 27, 2001.

(51) Int. Cl.[7] .................................................. H01R 13/44
(52) U.S. Cl. ........................................ 439/139; 439/137
(58) Field of Search ................................ 439/135, 136, 439/137, 138, 142, 143, 144, 145

(56) References Cited

U.S. PATENT DOCUMENTS

| 5,096,432 A | * | 3/1992 | Cullen et al. ................ 439/139 |
|---|---|---|---|
| 5,450,334 A | | 9/1995 | Pulizzi et al. ................ 364/492 |
| 5,485,397 A | | 1/1996 | Yamazato et al. ........... 364/492 |
| 5,621,256 A | | 4/1997 | Crane et al. ................. 307/125 |
| 5,745,159 A | | 4/1998 | Wax et al. ...................... 348/8 |
| 5,754,445 A | | 5/1998 | Jouper et al. ................ 700/295 |
| 5,835,127 A | | 11/1998 | Booth et al. .................... 348/8 |
| 5,929,895 A | | 7/1999 | Berry et al. .................... 348/8 |
| 5,962,989 A | | 10/1999 | Baker ........................... 315/294 |
| 5,984,513 A | | 11/1999 | Baldwin ................. 364/528.21 |
| 5,990,928 A | | 11/1999 | Sklar et al. ..................... 348/8 |
| 6,014,381 A | | 1/2000 | Troxel et al. ................ 370/395 |
| 6,016,016 A | | 1/2000 | Starke et al. ................. 307/9.1 |
| 6,055,165 A | | 4/2000 | Drobnik ......................... 363/44 |
| 6,169,568 B1 | | 1/2001 | Shigetomi ....................... 348/8 |
| 6,177,887 B1 | | 1/2001 | Jerome ......................... 390/945 |
| 6,249,913 B1 | | 6/2001 | Galipeau et al. ............... 725/76 |
| 6,301,674 B1 | | 10/2001 | Saito et al. .................. 713/320 |
| 2001/0024894 A1 | | 9/2001 | Mosebach et al. .......... 439/137 |

FOREIGN PATENT DOCUMENTS

| DE | 9211368 UI | 12/1992 | |
|---|---|---|---|
| EP | 0539093 A1 | 4/1993 | |
| EP | 0581078 A2 | 7/1993 | |
| EP | 0646990 A1 | 4/1995 | |
| EP | 0763875 A1 | 3/1997 | |
| GB | 612486 | 2/1950 | |
| WO | WO00/22488 | 4/2000 | ........... G05B/15/02 |

OTHER PUBLICATIONS

World Electric Guide, May 18, 2001, http://kropla.com/electric.htm.
World Electric Guide, May 18, 2001, http://kropla.com/electric2.htm.

* cited by examiner

Primary Examiner—Renee Luebke
Assistant Examiner—Ann McCamey
(74) Attorney, Agent, or Firm—Wiggin & Dana LLP; Gregory S. Rosenblatt; Michael K. Kinney

(57) ABSTRACT

An outlet unit for providing a supply voltage to the prongs of a plug comprising a housing having a plurality of electrically conductive plug channels for receiving the prongs of the plug, a shutter rotatably mounted to the housing and operative in one of a first and a second position, the shutter having openings for receiving the prongs of the plug wherein only when in the second position the openings of the shutter and the plug channels are aligned permitting axial displacement of the prongs into the housing, and a strike plate located between the housing and the shutter for preventing the rotation of the shutter to the second position absent axial displacement of the prongs sufficient to engage the strike plate.

13 Claims, 6 Drawing Sheets

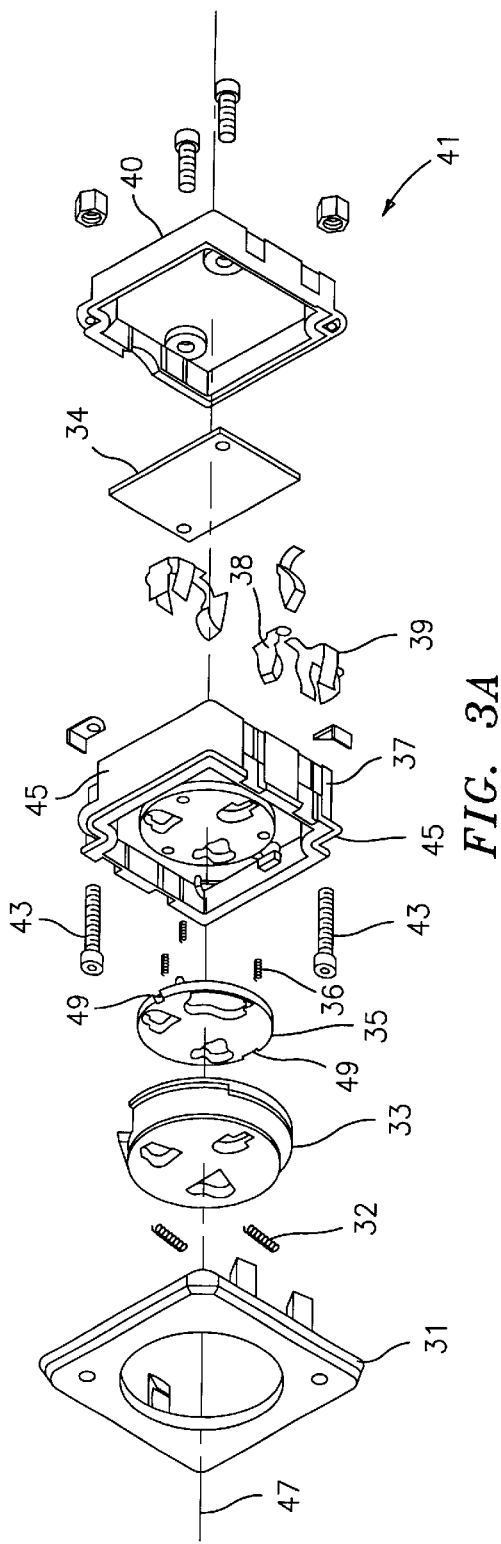
*FIG. 3A*
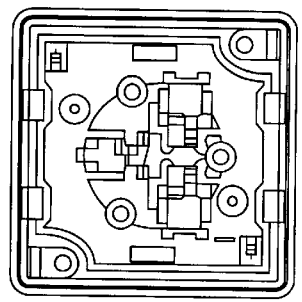
*FIG. 3E*
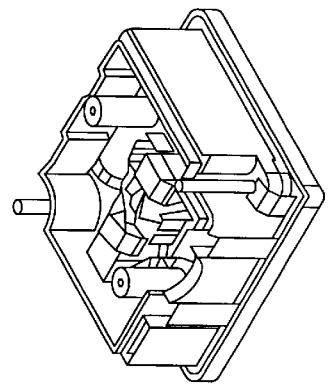
*FIG. 3D*
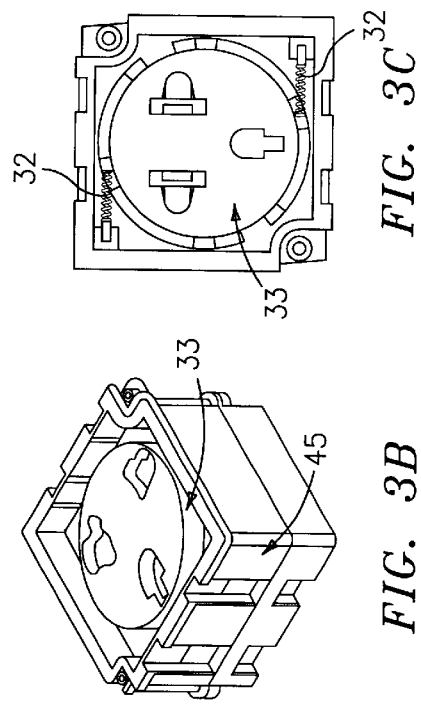
*FIG. 3C*
*FIG. 3B*

APPARATUS FOR PROVIDING AC POWER TO AIRBORNE IN-SEAT POWER SYSTEMS

CROSS-REFERENCE TO RELATED APPLICATIONS

This patent application relates to and claims priority to United States Provisional Patent Application Ser. No. 60/286,914 entitled "Apparatus for Providing AC Power to Airborne In-Seat Power Systems," by Hambley et al., that was filed on Apr. 27, 2001.

STATEMENT REGARDING FEDERALLY SPONSORED RESEARCH OR DEVELOPMENT

Not Applicable.

BACKGROUND OF THE INVENTION (1) Field of the Invention

This invention relates to an apparatus for converting an input AC signal to an alternatively configured output signal and providing the output signal to one or more devices. More specifically, the present invention relates to a method of producing a modulated AC signal for use by electrical devices as well as an outlet unit through which the AC signal may be channeled.

(2) Description of the Related Art

There exist outlet units for mating with the prongs of a plug through which power is to be supplied to a device which employ mechanical switches to detect the insertion of a plug. An example of an existing outlet unit is described in U.S. Pat. No. 6,016,016 of Starke et al. the disclosure of which is incorporated herein in its entirety by reference. Some existing outlet units make use of a plug case sensor to determine when it is safe to supply power to a plug. A plug case sensor senses the physical contact of a plug against a surface of the outlet unit. Power is enabled to a device only when the plug of the device exerts sufficient pressure against the plug case sensor to indicate that the plug is sufficiently connected to the outlet unit. Unfortunately, when used on a vehicle, the vibration which often attends the motion of the vehicle is sufficient to dislodge a plug from the plug sensor case. In such circumstances, provision of power to the plug from the outlet unit is rendered intermittent.

Many existing outlet units are attached to In Seat Power Systems (ISPS). An example of an ISPS is described in U.S. Pat. No. 5,754,445 of Jouper et al. the disclosure of which is incorporated herein in its entirety by reference.

There is therefore needed an outlet unit which can detect a plug insertion without the need for mechanical switches extraneous to the plug itself. In addition, it is preferable to utilize an outlet unit which does not rely upon a plug case sensor to determine when there is sufficient contact between the plug and the outlet unit to continue to provide power. Lastly, there is needed an ISPS configured to filter out the Electro-Magnetic Interference (EMI) produced by an offending device so that the device may continue in use without the need to restrict the provision of power to the offending device.

SUMMARY OF THE INVENTION

Accordingly, one aspect of the present invention is drawn to an outlet unit for providing a supply voltage to the prongs of a plug comprising a housing having a plurality of electrically conductive plug channels for receiving the prongs of the plug, a shutter rotatably mounted to the housing and operative in one of a first and a second position, the shutter having openings for receiving the prongs of the plug wherein only when in the second position the openings of the shutter and the plug channels are aligned permitting axial displacement of the prongs into the housing, and a strike plate located between the housing and the shutter for preventing the rotation of the shutter to the second position absent axial displacement of the prongs sufficient to engage the strike plate.

Another aspect of the present invention is drawn to An apparatus for converting a DC input signal to one or more AC output signals comprising a timer/control for emitting modulated timing and logic control signals, and a power converter for receiving the modulated timing and control signals comprising a plurality of master chopper oscillators responsive to the modulated timing and control signals so as to alter the voltage of the DC input signal for output as a single phase of one of the AC output signals, a plurality of current limiting chopper oscillators responsive to the modulated timing and control signals so as to alter the voltage of the DC input signal for output as a single phase of one of the AC output signals, a current integrator in electrical contact with one of the AC output signals the current integrator capable of measuring current drawn from the AC output signal and modifying the control signals of the current limiting chopper oscillators so as to shorten the duration of time of each positive or negative voltage phase of the AC output signal.

The above-stated objects, features and advantages will become more apparent from the specification and drawings that follow.

BRIEF DESCRIPTION OF THE DRAWINGS

FIG. 3A is an exploded view of an outlet unit in accordance with the present invention.

FIG. 3B is an isometric view of the outlet unit of FIG. 3A, with bezel removed.

FIG. 3C is front view of the outlet unit of FIG. 3A, with bezel removed.

FIG. 3D is an isometric view of a housing of the outlet unit of FIG. 3A, with contacts installed.

FIG. 3E is back view of the housing of the outlet unit of FIG. 3A, with contacts installed.

DETAILED DESCRIPTION

Figure 1:
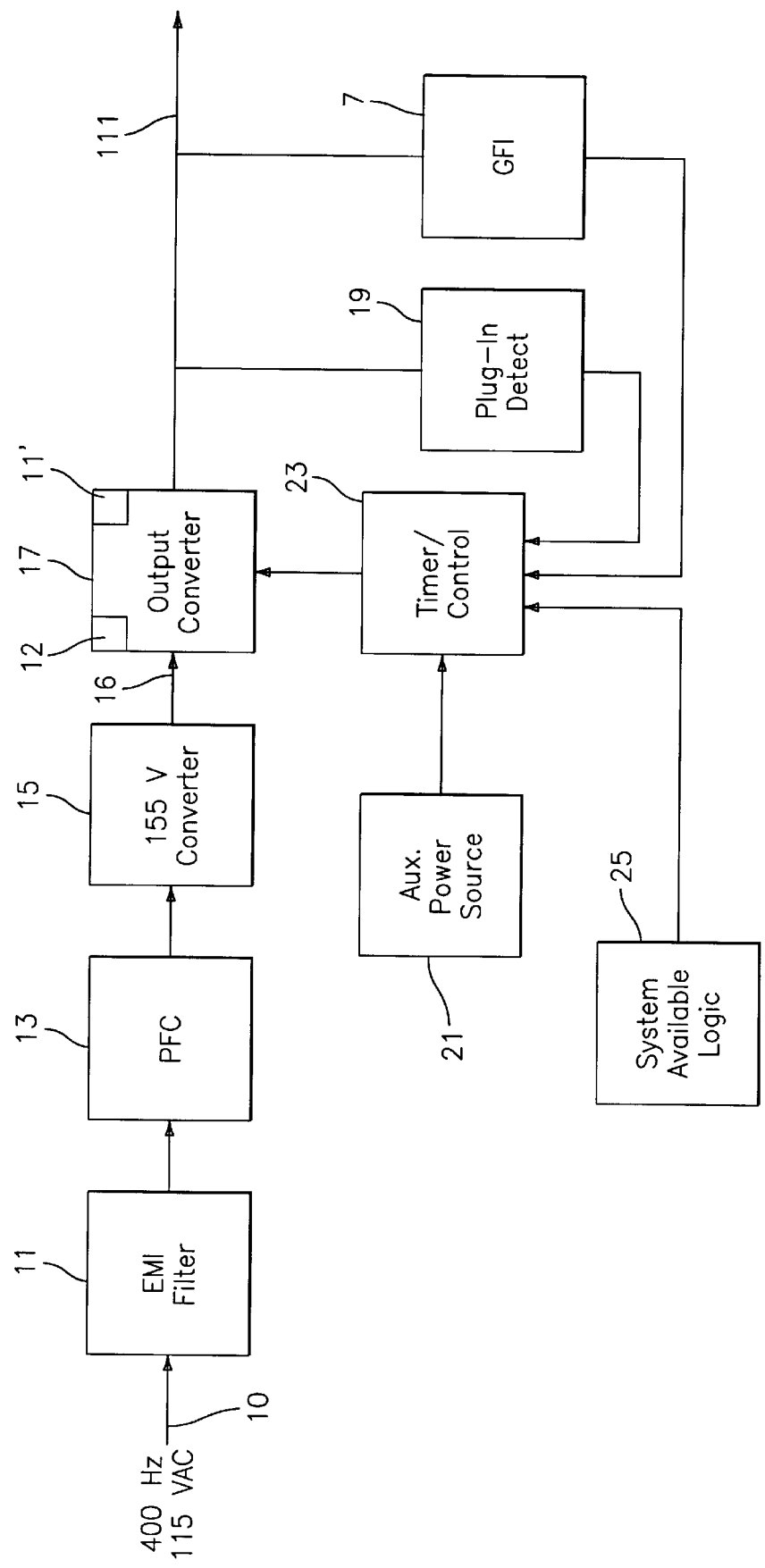
FIG. 1 is a block diagram of an ISPS in accordance with the present invention.

With reference to FIG. 1, there is illustrated in block diagram form the progression from a 400 Hz/115VAC input signal 10 into an EMI Filter 11 to a PFC (Power Factor Correction) 13 to a 155VDC Converter 15. The 155VDC output 16 as illustrated is converted to a 155VAC output for use in an ISPS. With regard to the present invention, there follows a description of the elements which combine in operation to form the power converter and outlet unit.

The EMI Filter 11 serves to filter out conducted Electro-Magnetic Interference (EMI) out of the ISPS. The EMI filter 11 filters out EMI that might travel from load drawing devices back into the aircraft's power supply and find its way into flight critical electrical devices. Connected to the EMI filter 11 is the PFC 13 that serves to eliminate current harmonics present in the ISPS. Connected in series with the PFC 13 is the 155VDC converter 15. The 155VDC converter 15 serves to convert the 400 Hz/115VAC input signal into a 155VDC signal. EMI filter 11, PFC 13, and 155VDC converter 15 may be assembled from any number of commercially and readily available components known in the art.

Figure 7:
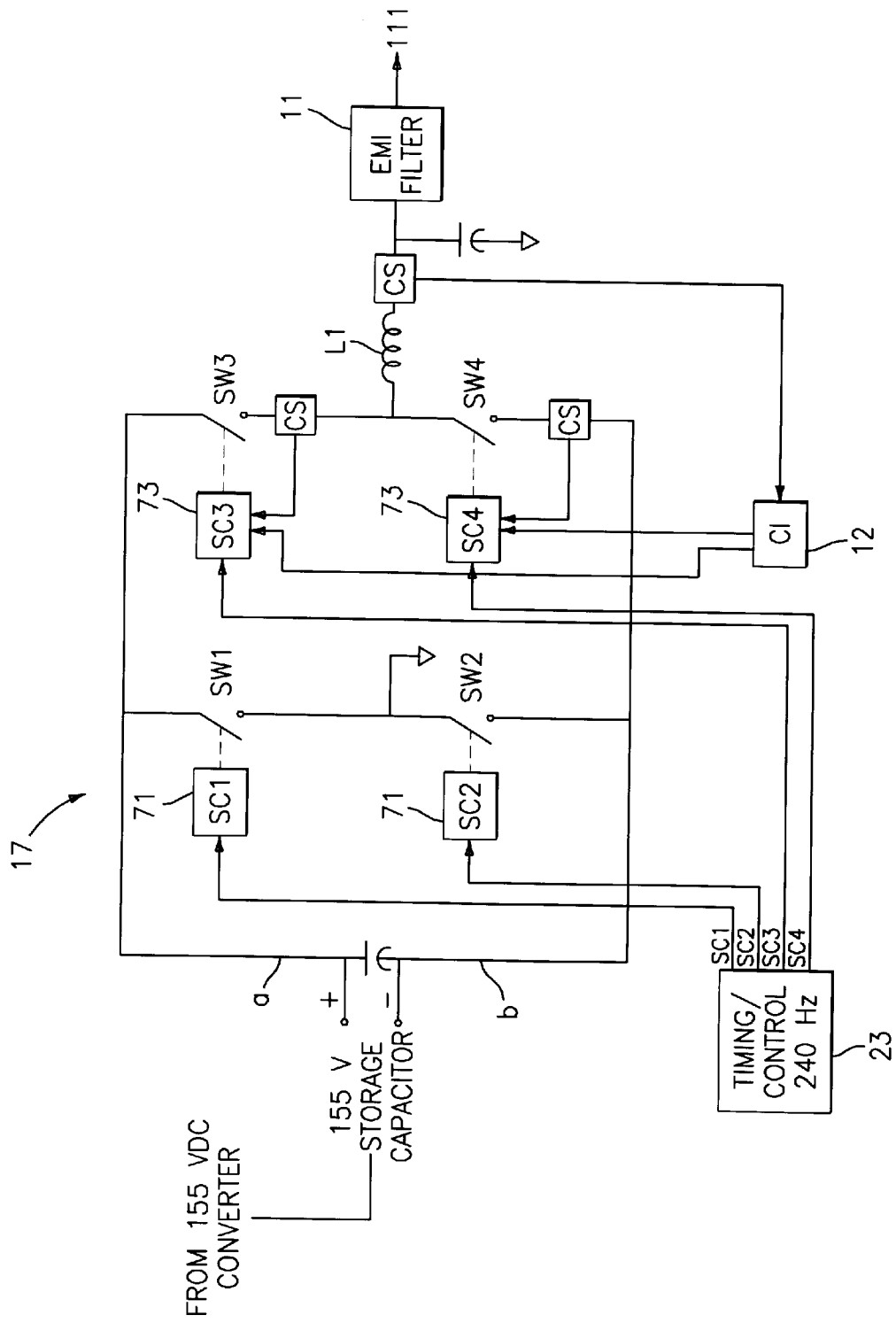
FIG. 7 is a schematic diagram of an output converter and timer/control of the present invention.

Output converter 17 receives 155VDC output 16 and converts it into a 115VAC output signal 111. While illustrated herein as consisting of a single 155VDC output 16 being converted into a single output signal 111, there may in practice be a plurality of 155VDC outputs connected to a plurality of output converters 17 which in turn output a plurality of output signals 111. Such an alteration to the configuration of the present invention described herein would be readily ascertainable to one skilled in the art. With reference to FIGS. 1 and 7, output converter 17 is comprised, in part, of current integrator 12, master chopper oscillators 71, current limiting chopper oscillator 73, and EMI filter 11'.

It is the purpose of the output converter 17 to output a pseudo sine wave on output line 111 for use by electrical devices. The operation of the components of the present invention which interact to produce the required pseudo sine wave 211 is described herein with reference to FIGS. 1, 2, and 7. As is illustrated, the output converter receives a 155VDC signal and outputs output signals 111. While illustrated as receiving a 155VDC input signal and outputting a 60 Hz 155VAC signal, an output converter 17 of the present invention is not so limited. Rather an output converter 17 of the present invention could be readily modified to convert a range of input DC voltages to an output AC signal of the same or different voltage wherein the frequency of the output signal may likewise be chosen from a wide range of desired frequencies such as 220VAC, 50 Hz as commonly available in Europe and 240VAC, 50 Hz as commonly available in Australia.

Referring to FIG. 1, while illustrated as a box, plug-in detect 19 is comprised of circuitry and hardware disclosed more fully in the text which follows. Plug-in detect 19 determines whether or not a valid plug attempt has been successfully completed. If a plug has been correctly inserted into an outlet unit of the present invention, the plug-in detect will direct timer/control 23 via a high logic signal to turn on the output converter 17. As used herein, a "high logic" condition is one in which the voltage of a signal is sufficiently high to be interpreted as a boolean 1 for purposes of performing boolean logic. The ground fault interrupt senses the current differential through the power cord of a plugged in device back to ground. Similarly, if the ground fault interrupt 7 does not sense a substantial current differential through the power cord of a plugged in device back to ground, a high logic signal is directed to timer/control 23. Auxiliary power source 21 provides the power to timer/control 23 required to power the logic circuits contained therein and which are described more fully in the following. System available logic 25 directs a high logic signal to timer/control 23 when there is power available for distribution to a power requesting load device. Timer/control 23 effectively performs an AND function on the input signals received from system available logic 25, plug-in detect 19, and ground fault interrupt 7. In the event that all such input signals correspond to a high logic signal, timer/control 23 proceeds to emit a 240 Hz timing signal for input into the output convertor 17.

Figure 2:
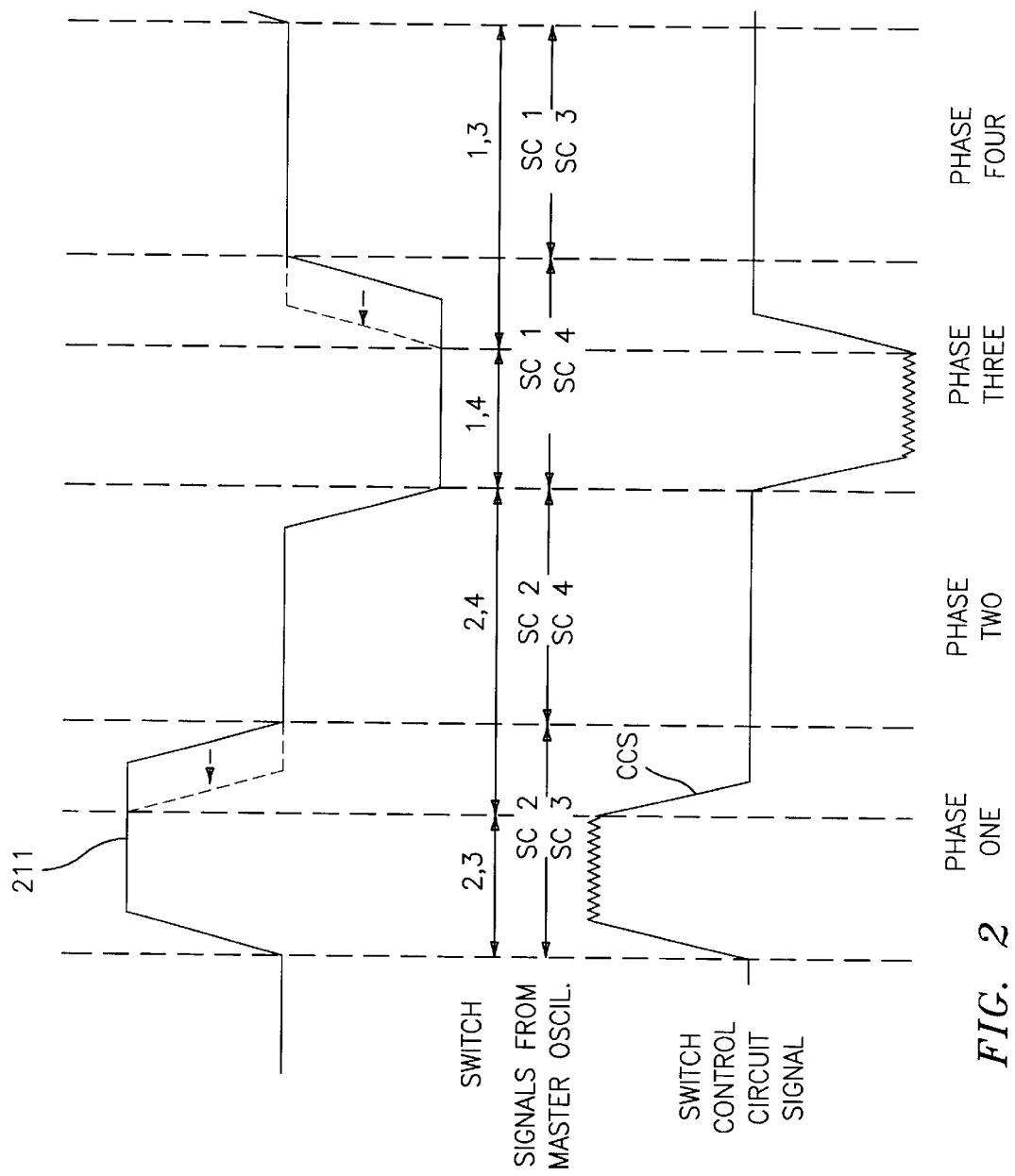
FIG. 2 is a diagram of a pseudo sine wave output signal of the present invention.

Under normal operating conditions, output converter 17 makes use of several chopper oscillators 71, 73 to segment the incoming 155VDC signal, alter the voltage of the segments into a pseudo sine wave for output, and output the newly constructed 155VAC signal as output signal 111. With reference to FIG. 7 and FIG. 2 there is now described the operation of power converter 17 to produce output signal 111.

Timer/control 23 is comprised in part of a 240 Hz signal generator. As can be seen in FIG. 2, the pseudo sine wave of output signal 111 is comprised of four phases. Each of the four phase requires a different logic input to direct the master chopper oscillators 71 and the current limit chopper oscillators 73 to pull the output signal 111 to a voltage defined by one of the four phases. Because each full cycle of the output signal 111 requires four phases, and each phase change occurs at a single clock cycle or control signal of the 240 Hz signal generator, the resulting output signal is a 60 Hz signal (240 Hz divided by 4).

As is illustrated, timer/control 23 outputs four logic switch control signals SC1, SC2, SC3, and SC4. SC1 and SC2 control the operation of master chopper oscillators 71. Similarly, SC3 and SC4 control the operation of current limiting chopper oscillators 73. When the timer/control 23 sends a logic high signal to any of the switch controls, the corresponding switches are closed thereby altering the output voltage of output signal 111. In phase 1, SC1 and SC2 are activated. In phase 2, SC2 and SC4 are activated. In phase 3, SC1 and SC4 are activated. In phase 4, SC1 and SC3 are activated. Under normal operating conditions, signals sent from the timer/control 23 to the chopper oscillators 71, 73 of output converter 17 result in the 60 Hz 155VAC pseudo sine wave signal detailed in FIGS. 2a and 2b. At 60 Hz, the duration of each phase of the four phase output signal cycle is approximately 4.17 ms in duration. As a result, pseudo sine wave 211 yields a 110V rms signal as well as the same (155V) peak voltage as would a true 110V rms sine wave.

The power system of the invention is particularly useful to provide power to personal devices carried by a passenger onto a vehicle, such as an aircraft, ship or bus. In particular, the vehicle is a commercial aircraft. An exemplary load device for drawing power from the present invention is an AC-adapter laptop computing device. Such laptops utilize rectified peak detectors which are also typically transformer isolated. Because the peak voltage of a true sine wave is equivalent to the peak voltage of the pseudo sine wave 211, the inductive currents in the transformers of such laptop loads will be approximately the same. A true 110VAC sine wave has an average voltage of 99V (computed as 110V*sqrt2*2/pi). Because pseudo sine wave 211 is at ±155V for two phases of each cycle and at 0V for the remainder, use of the pseudo sine wave 211 creates 22% less average voltage (77.5V) in the adapter transformers than would a true 110VAC sine wave. Therefore, the output pseudo sine wave of the present invention provides at least 75 W of power to devices attached so as to receive the output signal while remaining below the FAA mandated maximum power limit of 100 W for use in aircraft. In the present invention as will be described more fully below, the power provided through the pseudo sine wave 211 is limited to a maximum of 80 W through the interaction of the current integrator 12, the timer/control 23, and the current limiting chopper oscillators 73.

Current input signal 711 senses the current flowing through L1 to output signal 111. Current input signal 711 is received by current integrator 12 which integrates over a single phase the amount of current flowing through output signal 111 to a load device receiving power. Should the amount of current outputted to a device over a single phase, for example phase 1 as illustrated in FIG. 2a, exceed the amount of current which may be provided such that the total power draw of the device remains under the allowed 80 W, the current integrator 12 can function to reduce the power consumption of the device. Specifically, in the event that the maximum allowable current for a cycle has been outputted to a device, the current integrator toggles the control signals sent by timer/control 23 to SC3 and SC4. Such a toggle could be achieved by XORing a logic high signal with SC3 and SC4. When such a toggle is performed before the usual 4.17 ms duration of a single phase, pseudo sine wave 211 returns from either ±155V to 0V earlier than usual. This phenomena is illustrated in FIG. 2a by the dotted lines representing a leftward shift, or prematurely occurring onset, in the voltage change from +155V to 0V and from −155V to 0V. As noted, while in phase 1, SC2 and SC3 are on. If SC3 is toggled off and SC4 is toggled on, the resulting SC2 and SC4 being on is the condition that brings about phase 2 in which the voltage drops from 155V to 0V. Similarly, while in phase 3, SC1 and SC4 are on. If SC4 is toggled off and SC3 is toggled on, the resulting SC1 and SC3 being on is the condition that brings about phase 4 in which the voltage rises from −155V to 0V. In this manner, the power supplied to a load device is maintained below a designated maximum value, for example 80 W. Once either SC3 or SC4 is toggled and the voltage is brought to 0V, the next 240 Hz signal from the timer/control 23 does not alter the switch control settings but rather maintains them as they were.

In addition to safe guarding against a load device drawing an excessive amount of power, the present invention similarly prevents any load from drawing a peak amount of current in excess of a predetermined amount. Typically, such a predefined peak amount of current is approximately 3 amps. If the peak current drawn by a load device reaches such a predefined peak current amount, SC3 and SC4 are provided with a control circuit signal between approximately 100 and 200 KHz which is then used to pulse width modulate the output signal 111.

Referring once again to FIG. 1, output converter 17 is includes EMI filter 11'. As noted above, each output converter may support multiple output signals 111 for use by a plurality of load devices. For example, a single output converter 17 may provide power via two output signal lines 111 to two laptop computers connected as load devices. Each laptop may produce EMI which could potentially be transmitted to the other laptop via the output converter 17. To prevent such an occurrence, each output converter 17 includes an EMI filter 11' connected so as to filter any EMI which might pass from one load to another via a single output converter 17. When combined with the EMI filter 11 noted above, each device is shielded from EMI coming from the main power source, is prohibited from injecting EMI back into the aircraft's other systems, and is shielded from EMI originating at the site of other devices plugged into the same ISPS unit.

The outlet unit of the present invention is illustrated with reference to FIG. 3. Outlet unit 41 is comprised generally of bezel 31, torque springs 32, shutter 33, strike plate 35, pressure springs 36, fastening pins 43, housing 37, sensor contacts 38, power contacts 39, printed circuit board 34, and cap 40. When assembled and in static mode, bezel 31 is fastened to housing 37 through the use of fastening pins 43 inserted through holes located at peripheral points near opposing corners and extending through bezel 31 and mating with receiving cavities 45 formed integral to housing 37.

Once assembled, shutter 33 rests generally flush with bezel 31. Torque springs 32 are attached to shutter 33 in such a fashion as to exert a radial torque upon shutter 33 sufficient to rotationally displace shutter 33 around axis 47. In its static configuration, the resting position of shutter 33 is such that torque springs 32 are least extended and shutter 33 is rotated around axis 47 such there is no correspondence between the openings in shutter 33 and the openings of strike plate 35. As a result, there is no continuous opening through which the prongs of a plug could be inserted through shutter 33, through strike plate 35 and into housing 37.

Continuing with the discussion of the static arrangement of the outlet unit 41, the outward facing face of strike plate 35 is pressed away from housing 37 and into contact with shutter 33 by a plurality of pressure springs 36. Pressure springs 36 are disposed between the housing 37 and strike plate 35. When pressed by pressure springs 36 into maximal contact with shutter 33, tabs located on the underside of shutter 33 and extending a short ways axially towards housing 37 engage slots 49 cut into the periphery of strike plate 35. Strike plate 35 is attached to housing 37 in such a way as to not permit axial rotation about axis 47. Therefore while strike plate 35 can extend back and forth a short distance along axis 47, it cannot rotate about axis 47. When strike plate 35 is maximally extended by pressure springs 36 against shutter 33, the slots 49 engage the tabs of shutter 33 so as to prevent the axial rotation of shutter 33. Only when strike plate 35 is sufficiently displaced along axis 47 towards housing 37 such that slots 49 no longer engage the tabs of shutter 33 can shutter 33 be radially displaced such that the openings through shutter 33 correspond to those of strike plate 35.

Figure 4:
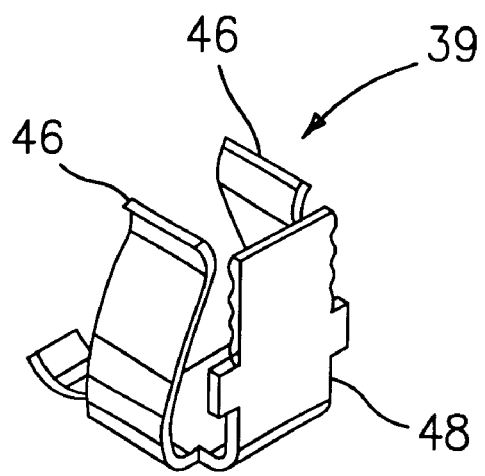
FIG. 4 is an isometric view of a power contact of the outlet unit of FIG. 3A.

With reference to FIG. 4 there is illustrated a power contact 39 of the present invention. Power contact 39 is comprised in part of opposing sides 46 and back plate 48. When positioned behind housing 37 as shown in FIG. 3A, the prongs of an inserted plug will contact the gently outwardly sloping ends of opposing sides 46 forcing a slight outward deformation of opposing sides 46. This slight outward deformation causes the opposing sides 46 of the power contact 39 to apply pressure against the plug prong and thus maintain physical and electrical contact with the prong. Depending on the configuration of the prong, the prong may also form a contact with back plate 48. As opposing sides 46 and back plate 48 are fashioned from the same piece of electrically conductive material, contact with either opposing sides 46 or back plate 48 is sufficient to enable electrical contact between the power contact 39 and the prong.

Figure 5:
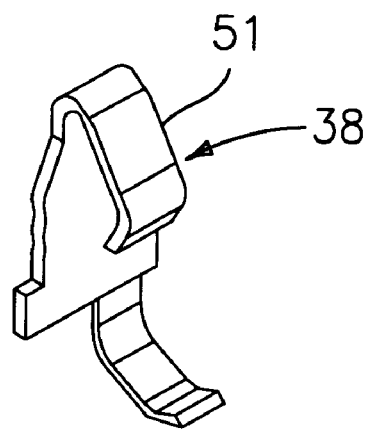
FIG. 5 is an isometric view of a sensor contact of the outlet unit of FIG. 3A.

With reference to FIG. 5, there is illustrated a sensor contact 38 of the present invention. Contact sensor 38 is constructed of a single piece of electrically conductive material. Contact sensor 38 is comprised in part of contact hook 51. When positioned behind housing 37 as shown in FIG. 3, the prongs of an inserted plug will contact contact hook 51 forming a slight outward deformation of contact hook 51. The resulting deformation will cause contact hook 51 to exert pressure against the prong of the plug so as to assure both physical and electrical connectivity between the sensor contact 38 and the plug prong.

With continued reference to FIG. 3A, both power contacts 39 and sensor contacts 38 are positioned to receive and maintain contact with the prongs of a plug. In addition, both power contacts 39 and sensor contacts 38 are provided electrical connectivity to printed circuit board 34. Printed circuit board 34 contains circuit traces capable of carrying electrical impulses to the plug-in detect 19 of FIG. 1. To avoid exposure and subsequent connectivity to any external element, power contacts 39, sensor contacts and 38, and printed circuit board 34 are enclosed between housing 37 and cap 40. Cap 40 is attached to housing 37 by means of a bolt, screw, adhesive, or other apparatus capable of providing sufficient attachment force sufficient to avoid the separation of cap 40 from printed circuit housing 37.

Figure 6:
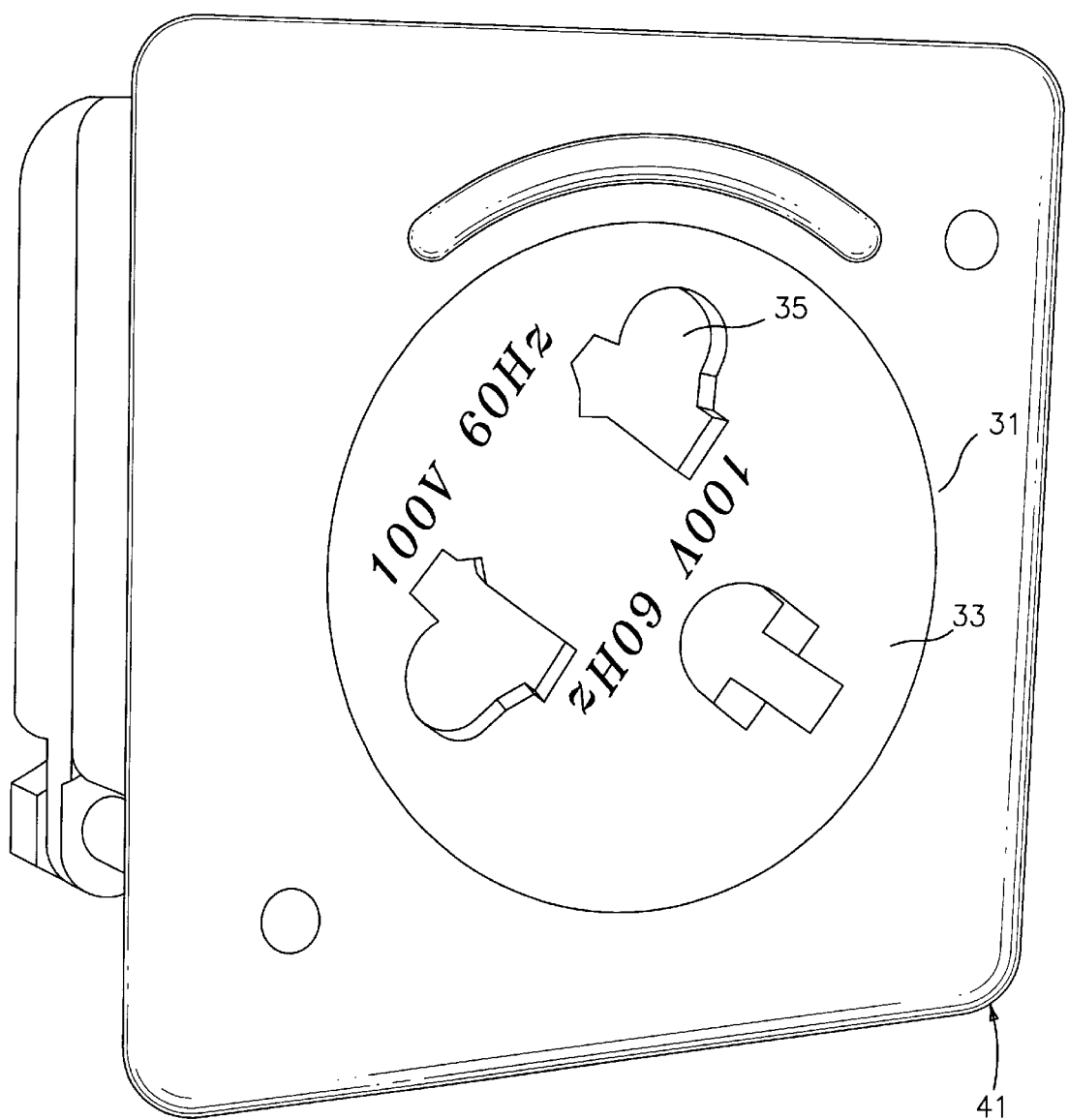
FIG. 6 is an isometric view of the outlet unit of FIG. 3A.

With reference to FIG. 6, there is illustrated a perspective view of outlet unit 41 in its static state in accordance with the present invention. As used herein, static state refers to the configuration of an outlet unit 41 absent the insertion of the prongs of a plug. As described above, shutter 33 through which the prongs of the plug are to be inserted is rotated approximately 45 degrees about its center. When the prongs of a plug are inserted with through the holes in the face of shutter 33, they come into physical contact with strike plate 35. As described, strike plate 35 is pressed outwards against the back side of shutter 33 by pressure springs 36. When the prongs of a plug are inserted through shutter 33 and into contact with strike plate 35 with sufficient force, the force exerted upon strike plate 35 by pressure springs 36 is counter balanced and the strike plate 35 is moved axially back towards the housing 37. When the strike plate 35 has been so moved sufficiently, the engage slots 49 of the strike plate 35 extend so as to no longer engage the tabs attached to shutter 33 and shutter 33 is able to rotate such that the openings through shutter 33 are in correspondence with those of strike plate 35.

As used herein, a "plug channel" is the empty space through which the prongs of a plug may be inserted. The plug channels of the present invention are formed from the openings in the shutter 33, the strike plate 35, through the housing 37, and on till the power and sensor contacts 38,39. As the inserted prongs of a plug proceed further into the plug channel, each prong contacts a power contact 39 and then a sensor contact 38. The power contact 39 is not initially activated to provide power. The power contact 39 remains off until the control circuitry of the plug-in detect 19 attached to the sensor contact determines that power is to be provided. The control circuitry senses electrical continuity between the power contact 39 and the sensor contact 38 provided by the prongs of the plug and ensures that such continuity is provided along both prongs within a predetermined time, nominally 200 milliseconds of each other. Preferably, this predetermined time is between 0 and 300 milliseconds and more preferably, between 150 milliseconds and 250 milliseconds. Only if such continuity is established within this timeframe is current enabled to flow through the power contacts. When removing a plug, the sensor contacts 38 can sense that that the plugs are no longer in contact with them as the plug is pulled out. As a result, the flow of current can be stopped prior to the plug passing past the power contacts 39. In this manner, the presence of arcing is avoided when a plug is removed.

Prior art outlet units typically rely on mechanical microswitches to sense the insertion of a plug before providing power. In an aspect of the present invention, the plug itself is used to test for continuity with no need for additional mechanical switches. In other implementations, prior art outlets make use of a plug case sensor. The plug case sensor requires constant pressure upon it provided by the case of the inserted plug to cause power to be provided. Such a system is unreliable as aircraft vibration may partially evacuate an otherwise engaged plug through which current may and should still flow. The plug of the present invention is capable of operation without a plug case sensor and therefore does not suffer from the noted deficiency of plug case sensors.

In addition, after turning a plug through the required 45 degree angle of the present invention and then inserting the plug until electrical contact is made between the prongs of the plug and the sensors 38, 39 of the outlet, there remains a substantial residual torque arising from the predilection of the outlet unit to return to its 45 degree offset. This torque provides for a secure fitting of the plug of a device into an outlet unit 41 and resists the tendency to become loose as a result of prolonged exposure to aircraft vibration.

With reference to FIG. 3A, there is illustrated the pattern of openings extending through shutter 33 through which the prongs of a plug may be extended. These openings need not match the precise openings required by only a single class of plugs to facilitate the insertion and extension of the prongs of the plug through shutter 33 and into contact with sensor contacts 38 and power contacts 39. Rather, as is illustrated, the openings in the shutter 33 preferably form a superposition of the openings required for a plurality of plug classes. Such classes include, for example, the generally rectangular cross-section of a United States prong and the generally circular cross-section of a European prong. In this manner, an outlet unit 41 of the present invention may serve as a universal outlet constructed to receive the prongs of a variety of plug classes and provide power thereto.

What is claimed is:

1. An outlet apparatus for receiving an electrical plug of a device to provide power to the device, comprising:
   a housing having a longitudinal axis;
   a shutter having a central portion with front and rear surfaces and aperture means for receiving prongs of the plug;
   a strike plate having a central portion behind the shutter and aperture means for receiving prongs of the plug;
   spring means for biasing the shutter toward a first orientation about the longitudinal axis and for forwardly biasing the strike plate toward a first position along the longitudinal axis;
   interlock means for preventing rotation of the shutter relative to the strike plate to permit insertion of the prongs through the aperture means of both the shutter and strike plate unless the prongs are first inserted through the aperture means of the shutter and then depress the strike plate rearward by a predetermined amount; and
   electrical contacts positioned to engage the prongs with the plug in an inserted condition and the prongs passing through the aperture means of both the shutter and the strike plate.

2. The outlet apparatus of claim 1 wherein:
   said electrical contacts include:
      at least first and second power contacts associated with a first and a second of said prongs; and
      a first sensor contact associated with the first prong;
   the outlet apparatus further comprises a control circuit coupled to the first power contact and the first sensor contact for enabling the supply of voltage across said first and second power contacts responsive to the control circuit sensing the establishment of electrical continuity between the first sensor contact and the first power contact via the first prong.

3. The outlet apparatus of claim 2 wherein:

said electrical contacts include a second sensor contact associated with the second prong;

the control circuit is coupled to the second power contact and the second sensor contact; and the control circuit so enables the supply of voltage across said first and second power contacts responsive to the control circuit sensing that the establishment of electrical continuity between the first sensor contact and the first power contact via the first prong and the establishment of electrical continuity between the second sensor contact and the second power contact via the second prong occurs within a time period not exceeding a predetermined maximum.

4. The outlet apparatus of claim 3 wherein the time period is between 0 and 300 milliseconds.

5. An outlet unit for providing a supply voltage across first and second prongs of a plug comprising:

a housing;

at least first and second electrical contacts;

a shutter having openings for receiving the prongs; and a strike plate having:
- a blocking portion blocking the openings in a first position and mounted for longitudinal rearward movement from the first position to a second position upon an initial insertion of the plug with at least one of the prongs driving said movement by contacting said blocking portion; and
- a surface cooperating with the shutter to restrain rotation of the shutter in the first position but not so restraining rotation of the shutter in the second position and wherein a rotation of the plug and shutter disengages the at least one prong from the blocking portion so as to permit a further insertion of the prong relative to the strike plate so as to bring the first and second prongs into respective engagement with the first and second electrical contacts.

6. The outlet unit of claim 5 wherein:

the housing has a transverse web with openings for receiving the prongs;

at least one coil compression spring between the web and the strike plate biases the strike plate from the second position toward the first position; and the strike plate has a surface cooperating with the housing to restrain rotation of the strike plate.

7. The outlet unit of claim 5 further comprising:

at least one spring biasing the shutter from the second orientation toward the first orientation so that with the plug inserted and its prongs engaging the electrical contacts said spring forcibly engages the shutter against at least one of the prongs and produces friction resisting longitudinal movement of the plug.

8. The outlet unit of claim 5 wherein:

said surface comprises a channel in an annular perimeter portion of the strike plate and so cooperates with a longitudinal internal rib along a sleeve portion of the shutter extending rearward from a central shutter portion containing the shutter openings.

9. The outlet unit of claim 5 wherein:

said surface so cooperates with a longitudinally-extending surface of the shutter.

10. An outlet unit for providing a supply voltage to the prongs of a plug comprising:

a housing having a plurality of electrically conductive plug channels for receiving the prongs of the plug, wherein two of the plug channels comprise a power contact through which voltage may be supplied to one of said prongs and a sensor contact not in physical or electrical contact with said power contact;

a shutter rotatably mounted to the housing and operative in one of a first and a second position, the shutter having openings for receiving the prongs of the plug wherein only when in the second position the openings of the shutter and the plug channels are aligned permitting axial displacement of the prongs into the housing;

a strike plate located between the housing and the shutter for preventing the rotation of the shutter to the second position absent axial displacement of the prongs sufficient to engage the strike plate; and a control circuit coupled to the power contact and the sensor contact of each of the plurality of plug channels for enabling the supply of voltage to each of said power contacts when the control circuit senses that the establishment of electrical continuity between the sensor contact, the prong, and the power contact in each of the plurality of prong channels occurs within a time period not exceeding a predetermined maximum;

wherein engagement of the shutter to the strike plate is sufficient to prevent the rotation of the shutter to the second position absent axial displacement of the prongs sufficient to displace the strike plate, and wherein when in the second position the shutter maintains a sufficient residual torque to rotate back into the first position such to resist axial withdrawal of the prongs of the plug from the housing.

11. The outlet unit of claim 10 wherein the time period is between 0 and 300 milliseconds.

12. The outlet unit of claim 11 wherein the time period is between 150 and 250 milliseconds.

13. The outlet unit of claim 10 wherein the control circuit disables the supply of voltage to each of said power contacts when the control circuit senses the loss of electrical continuity between the sensor contact, the prong, and the power contact in at least one of the plurality of prong channels.

* * * * *